Aug. 16, 1955  C. L. MENG  2,715,383
APPARATUS FOR GENERATING ULTRASONIC WAVES
Filed Feb. 15, 1951
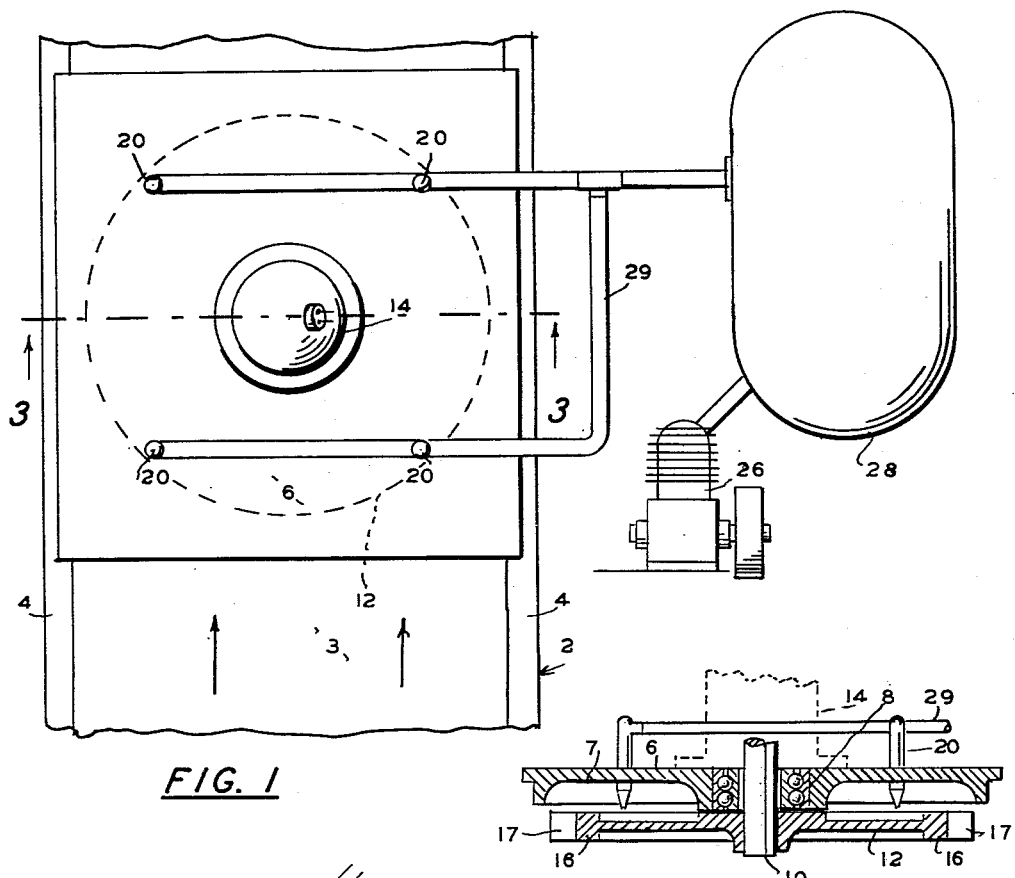
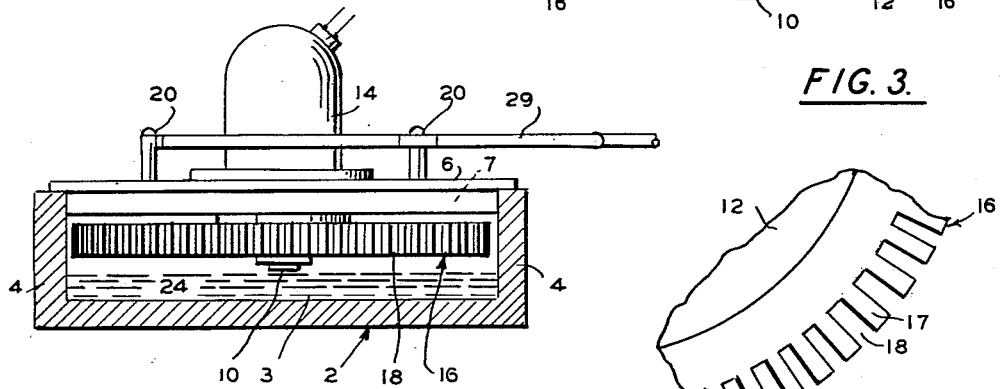
FIG. 1
FIG. 2
FIG. 3
FIG. 4
Inventor
CARL L. MENG
By Scott L. Norwiel
Attorney

United States Patent Office 2,715,383
Patented Aug. 16, 1955

2,715,383

APPARATUS FOR GENERATING ULTRASONIC WAVES

Carl L. Meng, Phoenix, Ariz.

Application February 15, 1951, Serial No. 211,148

2 Claims. (Cl. 116—137)

This invention pertains to apparatus for the destruction of micro-organisms by means of high frequency vibrating energy waves.

Heretofore it has been discovered that bacteria may be killed by subjecting the media in which they live to vibrations of a frequency above that of sound. Since bacteria or micro-organisms of the type herein concerned are infinitely small the vibrations or energy waves to be generated must be of correspondingly high frequency short length. For the purposes here concerned vibrations of the order of approximately 100,000 per second are considered adequate, and it is, therefore one of the objects of my invention to provide apparatus capable of generating energy waves of such frequency.

Some application of waves of a similar frequency has heretofore been made to the destruction of micro-organisms but results have been limited to the treatment of small volumes of liquids; the reason being that it has not been possible to transmit any great amount of power to the liquid or other media in which the micro-organisms exist. As a rule electronic means has been used for generating electrical oscillations which were then applied to the media by means of piezo-electric crystals or magneto strictive devices.

In view of this, another object of my device is to provide mechanism for mechanically generating vibrating energy waves of the frequency desired wherein a much greater amount of power may be converted into energy waves than has heretofore been possible;

Still another object is to provide means whereby the energy of the vibrating waves may be transmitted to liquid media in which the micro-organisms exist in a direct and efficient manner to the end that the media will vibrate in a manner which will disrupt the cytoplasmic membranes or cell walls of the organisms.

The objects therefore also contemplate the sterilization of such liquids as sewage effluents by means of mechanically generated and applied energy waves in the supersonic range.

Other objects will appear hereinafter.

I attain the foregoing objects by means of the apparatus mechanism and combination of parts illustrated in the accompanying drawings, in which—

Figure 1 is a plan view of one form of apparatus incorporating my invention;

Figure 2 is an end elevation thereof,

Figure 3 is a sectional elevation thereof taken substantially on line 3—3, Figure 1; and Figure 4 is a plan view of a fragment of the vibrator generating wheel drawn on an enlarged scale.

The base of the apparatus herewith illustrated consists of a channel trough 2 having a flat level bottom 3, and upwardly extending sides 4 through which liquids containing the micro-organisms to be destroyed may be flowed at a shallow depth.

Resting on the sides 4 of this channel is a frame 6 which spans the channel and has a circular concave vibration reflector 7 on its under surface in the center of which there is a bearing box 8 adapted to journal vertical rotor shaft 10. This shaft is keyed to and supports a vibration generating rotor 12, which extends substantially across the width of channel 2 and is elevated from the bottom 3 thereof to rotate in a predetermined spaced relation therefrom.

Mounted on frame 6 and over shaft 10 there is a high speed motor 14, which has a vertical shaft coupled directly to shaft 10.

The rim 16 of the rotor is provided with a large number of interrupting fins 17 formed by radially extending notches 18. The fins 17 interrupt blasts of compressed air directed from nozzles 20 downward through the notches and toward the bottom of channel 2. In the preferred form of this apparatus there are four annularly arranged equally spaced nozzles and there is an even number of notches and interrupting fins. Thus since nozzles 20 are equally spaced the blasts or jets issuing from them will be interrupted at the same time by equally spaced, diametrically positioned, notches and fins. Vibrations produced by each of said jets will therefore be of the same frequency, and will be timed simultaneously. The effect of vibrations produced by each jet will therefore be additive. The blasts of air from the jets being directed downward toward channel bottom 3 will impinge on the surface of any liquid 24 which may be resting in or flowing through channel 2. The reflector 7 keeps vibrations above the rotor from being absorbed and reflects them downward toward the surface of liquid 24.

Compressed air may be obtained by compressor 26 and fed from the receiver tank 28 to nozzles 20 at a pressure of about 150 pounds per square inch.

The motor 14 herein indicated as an electric motor is constructed to drive shaft 10 at a speed of from 3600 to 6000 R. P. M. Rotor 12 may have a diameter such that the circumference of rim 16 is 15 feet or 180 inches. There may be sixteen notches to the inch or 2880 notches in the entire circumference. At a speed of 3600, each fin would interrupt the flow of air from each nozzle through each notch 172,800 times per second. If the speed of the motor be increased the frequency of these vibrations would be increased accordingly. Since the jets 20 direct the compressed air downward toward the bottom of channel trough 2, or toward any liquid therein, the vibrations will impinge on this liquid so that their energy is imparted to the liquid as it flows beneath the rotor. A plurality of jets increases the energy, and the positioning of these jets may be such that the entire area of the flow may be brought into close proximity to one of the interrupted jet blasts. Substantially all micro-organisms in the fluid will, therefore, be subjected to the energy waves.

The fluid will pick up these vibrations directly from the air blasts, and indirectly from the reflector 7. The whole area beneath the rotor is charged with the energy of these super-sonic energy waves. Any micro-organisms having wave envelopes subject to rupture from vibrations of the order of 100,000 to 200,000 per second will be destroyed when liquid containing them is flowed beneath the rotor. Since the strength or amplitude of these vibrations is greater than those heretofore produced by electrical means the rapidity of killing of the organisms will be greater than by any means heretofore used and such quantities of liquid may rapidly be treated and sterilized that the apparatus disclosed may be applied to the treatment of drinking water for municipal use, and the sterilization of sewage.

Other uses, and many modifications of the apparatus here exemplified will become apparent to those familiar with the art; therefore I make the following claims.

I claim:

1. In an apparatus for generating ultrasonic waves: a rotor mounted for turning about an axis; the rotor having opposing faces, and being provided with a plurality of fins arranged around its periphery; the fins being spaced from each other to define unobstructed air-passageway notches extending between said opposing faces of the rotor and in axial alignment with said rotor; said notches extending radially into the rotor from the periphery thereof; at least one stationary air-jet nozzle substantially paralleling said axis, and having an outlet disposed for directing an air stream through the notches as they are successively moved into registration with the nozzle; means for delivering air under pressure to the nozzle for discharge therefrom; said outlet of the nozzle being located adjacent to one face of the rotor, and being positioned to discharge its air stream directly parallel with said axis in direct line with said passageway notches and into the successive notches as they are advanced; said notches providing radial escapement of the air from the rotor to thereby reduce turbulence of the air issuing from the nozzle; and means for turning the rotor about said axis at a sufficiently high speed so that the fins will successively interrupt the flow of the air stream through the rotor notches to produce ultrasonic waves; the rotor being entirely unobstructed on the face thereof disposed opposite said nozzle to thus allow unimpeded escapement of the waves from the rotor.

2. In an apparatus for generating ultrasonic waves; a rotor mounted for turning about an axis; the rotor having opposing faces, and being provided with a plurality of fins arranged around its periphery; the fins being spaced from each other to define unobstructed air-passageway notches extending between said opposing faces of the rotor and in axial alignment with said rotor; said notches extending radially into the rotor from the periphery thereof; at least one stationary air-jet nozzle substantially paralleling said axis, and having an outlet disposed for directing an air stream through the notches as they are successively moved into registration with the nozzle; means for delivering air under pressure to the nozzle for discharge therefrom; said outlet of the nozzle being located adjacent to one face of the rotor, and being positioned to discharge its air stream directly parallel with said axis in direct line with said passageway notches and into the successive notches as they are advanced; said notches providing radial escapement of the air from the rotor to thereby reduce turbulence of the air issuing from the nozzle; means for turning the rotor about said axis at a sufficiently high speed so that the fins will successively interrupt the flow of the air stream through the rotor notches to produce ultrasonic waves; the rotor being entirely unobstructed on the face thereof disposed opposite said nozzle to thus allow unimpeded escapement of the waves from the rotor; and a reflector having a surface disposed to reflect air waves through the notches of the rotor; said reflector having a diameter at least as large as that of the rotor and being axially disposed relative to the rotor and said nozzle lying between said rotor and said reflector.

References Cited in the file of this patent

UNITED STATES PATENTS

| Number | Name | Date |
|---|---|---|
| 2,063,950 | Steinberger | Dec. 15, 1936 |
| 2,138,051 | Williams | Nov. 29, 1938 |
| 2,138,839 | Chambers | Dec. 6, 1938 |
| 2,528,026 | Allen | Oct. 31, 1950 |
| 2,559,864 | Firth | July 10, 1951 |
| 2,562,545 | Gogolick | July 31, 1951 |
| 2,564,984 | Lyman | Aug. 21, 1951 |
| 2,570,081 | Szczeniowski | Oct. 2, 1951 |
| 2,578,673 | Cushman | Dec. 18, 1951 |

OTHER REFERENCES

Sounds That Burn, by R. W. Wood in Scientific American, March 1928, pages 201 to 204.